(12) United States Patent
Hersey et al.

(10) Patent No.: US 8,417,451 B2
(45) Date of Patent: Apr. 9, 2013

(54) AUTONOMOUS COOPERATIVE SURVEYING

(76) Inventors: John A. Hersey, Havre de Grace, MD (US); William J. Hersey, III, Harve de Grace, MD (US)

( * ) Notice: Subject to any disclaimer, the term of this patent is extended or adjusted under 35 U.S.C. 154(b) by 640 days.

(21) Appl. No.: 12/633,625

(22) Filed: Dec. 8, 2009

(65) Prior Publication Data

US 2010/0141518 A1 Jun. 10, 2010

Related U.S. Application Data

(60) Provisional application No. 61/120,734, filed on Dec. 8, 2008, provisional application No. 61/223,336, filed on Jul. 6, 2009.

(51) Int. Cl.
*G01C 21/00* (2006.01)
(52) U.S. Cl.
USPC ............................. 701/468; 701/517; 701/469
(58) Field of Classification Search .................. None
See application file for complete search history.

(56) References Cited

U.S. PATENT DOCUMENTS

| | | | | |
|---|---|---|---|---|
| 6,385,539 | B1* | 5/2002 | Wilson et al. ................. | 701/468 |
| 6,754,485 | B1* | 6/2004 | Obradovich et al. ....... | 455/414.1 |
| 7,031,836 | B2* | 4/2006 | Branch ......................... | 701/467 |
| 7,065,446 | B2* | 6/2006 | Chou ............................ | 701/472 |
| 7,127,348 | B2* | 10/2006 | Smitherman et al. ......... | 701/409 |
| 7,315,800 | B2* | 1/2008 | Meiners et al. .................. | 703/7 |
| 7,440,848 | B2* | 10/2008 | Anderson ..................... | 701/517 |
| 8,140,358 | B1* | 3/2012 | Ling et al. ........................ | 705/4 |
| 2008/0287144 | A1* | 11/2008 | Sabata et al. ................ | 455/456.6 |
| 2009/0005958 | A1* | 1/2009 | Roesser ........................ | 701/117 |
| 2009/0140887 | A1* | 6/2009 | Breed et al. .................... | 340/990 |

* cited by examiner

*Primary Examiner* — Michael J. Zanelli
(74) *Attorney, Agent, or Firm* — Procopio, Cory, Hargreaves & Savitch LLP; Pattric J. Rawlins

(57) ABSTRACT

A method and apparatus for measuring depth of waterways and elevation of land features through autonomous consolidation of GPS device data acquired from a plurality of mobile platforms is disclosed. The GPS device data may then be processed and compared to published reference data. A data recorder and a wireless transmission system comprise an onboard unit, which serves to interface with the GPS device for collecting, recording and transmitting data. The onboard device also provides an apparatus for collecting other georeferenced data from multiple mobile platforms, and serves as a node on a two-way meshed communication network.

25 Claims, 6 Drawing Sheets

AUTONOMOUS COOPERATIVE SURVEYING

RELATED APPLICATIONS

This application claims the benefit of U.S. provisional applications Ser. No. 61/120,734, filed Dec. 8, 2008, entitled "AUTONOMOUS HYDROGRAPIC SURVEYS," and Ser. No. 61/223,336, filed Jul. 6, 2009 entitled "AUTONOMOUS COOPERATIVE SURVEYING," which are hereby incorporated by reference.

BACKGROUND

1. Field of the Invention

The present invention relates generally to a means for collecting and processing geographical contour data used to create or update contour maps documenting land-based (topographic) and sea-based (hydrographic) elevation and depth features. In particular, the present invention provides for contour mapping utilizing horizontal position-based sensors, such as global positioning system ("GPS") based sensors, coupled with an elevation or depth measuring sensor, such as augmented GPS, radar altimetry, or sonar, applied to a quantity of mobile air, land, or sea platforms engaged in routine activities.

2. Related Art

The topographic and hydrographic features of the earth are ever changing due to erosion, sedimentation, shoaling, and the growing influence of human activities. For example, the lack of the most current and accurate subsurface terrain data (e.g., channel depth as a function of position) at the time of a ship's transit introduces a level of uncertainty that prevents optimal safety and navigational efficiency. Similar mobility impacts result from the lack of current knowledge of the earth's land elevation features.

Current methods of measuring elevation and water depth require deliberate missions using dedicated personnel and vehicles equipped with advanced instrumentation and expertise. These missions provide for the acquisition of very accurate measurements, but do so at high cost associated with procurement and operation of the vehicles and equipment involved. In addition, the areas targeted for detailed surveying are prioritized more so based on duration of time since the last survey was performed, as opposed to being based on an indication that a detailed resurvey is required. Budget and time constraints often limit proper survey efforts to a limited number of desired mapping areas.

In the Hydrographic Services Review Panel 2007 Special Report to the National Oceanic and Atmospheric Administration ("NOAA") Administrator, the number one recommendation was for NOAA to aggressively survey and map navigationally significant areas and shorelines by expanding in-house and contract survey capabilities to acquire and process more hydrographic mapping data. This is of such urgency due to the fact that U.S. coastal waters have never been completely surveyed, and for the areas that have been surveyed, much of the sounding data shown on NOAA nautical charts is pre-1940.

While surveying of waterways, for example, provides updated channel information, the information is typically used to revise paper charts instead of being made directly available to travelers. In the end, the lack of, or excessive latency in the delivery of updated information results in occasional grounding accidents and creates the potential for significant environmental dangers.

Therefore, what is needed is a system and method that provides updated survey information for heavily traveled land and sea areas, while maintaining within a reasonable budget and time constraint. Furthermore, what is needed is a system that is capable of expediently providing such survey information to those traveling via updated maps and nautical charts.

SUMMARY

The present invention provides a method and apparatus for the autonomous collection, processing, and distribution of location and elevation or water depth data (e.g., position data) acquired from a plurality of mobile platforms, engaged in routine activities. In some aspects, the acquired data is processed to correct for various factors such as those associated with ocean conditions, and a contour map is produced from the corrected data. It should be noted that "contour map" may refer to both "nautical charts" and "terrain charts".

The newly produced contour map may be compared against published reference maps (e.g., the latest contour map of the area). In areas where there are variances between the two maps, the proper authorities may be alerted and informed that more detailed investigation is needed.

In one embodiment, a system for collecting and processing position data includes a vehicle including a global positioning system (GPS) device and a data collection device in communication with the GPS device. The data collection device collects position data from the GPS device and is configured to transmit the position data to a remote data station.

In another embodiment, a system for storing and transmitting data includes a data collection device including a data interface module configured to receive position data, a data storage module configured to store the position data, and a wireless transmission module configured to transmit the position data. The data interface module is in communication with the data storage module and wherein the data storage module is in communication with the wireless transmission module.

In yet another embodiment, a method of processing position data includes receiving raw position data from a first vehicle and performing at least one of the following corrections: correcting the raw position data with attitude data; correcting the raw position data with horizontal data; correcting the raw position data with elevation or depth data; correcting the raw position data with environmental effect data.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a method and apparatus for measuring the elevation of land features and the depth of waterways through autonomous consolidation of three-dimensional positioning data acquired from multiple mobile platforms (e.g., personnel, vehicles, vessels, aircraft). The positioning data may then be processed and compared to published reference data. When discrepancies/variances appear between the processed elevation data and published reference data, a recommendation may be issued that a more thorough investigation of a particular area or shipping channel should be conducted.

After reading this description it will become apparent to one skilled in the art how to implement the invention in various alternative embodiments and alternative applications. However, although various embodiments of the present invention will be described herein, it is understood that these embodiments are presented by way of example only, and not limitations. As such, this detailed description of various alternative embodiments should not be construed to limit the scope or breadth of the present invention as set forth in the appended claims.

A large percentage of people, automobiles, aircraft, and marine vessels are equipped with GPS devices that integrate GPS data with an electronic navigational map or chart (ENC). The GPS device displays the ENC along with the position, heading and speed of the mobile platform, and may display additional georeferenced information (e.g., elevation or water depth) from sensors such as echolocators/sonar and radar altimeters.

In one aspect of the present invention, a vehicle equipped with a GPS device is further equipped with a data recorder and a wireless transmission system. Such combination of the data recorder and wireless transmission system is hereinafter referred to as an onboard unit and serves to interface with the GPS device for collecting, recording and transmitting data. The GPS device and onboard unit may interface using standard wired or wireless technology in accordance with IEEE 802.11, for example. The GPS device and onboard unit may comprise separate hardware or may reside together as a single device.

Figure 1:
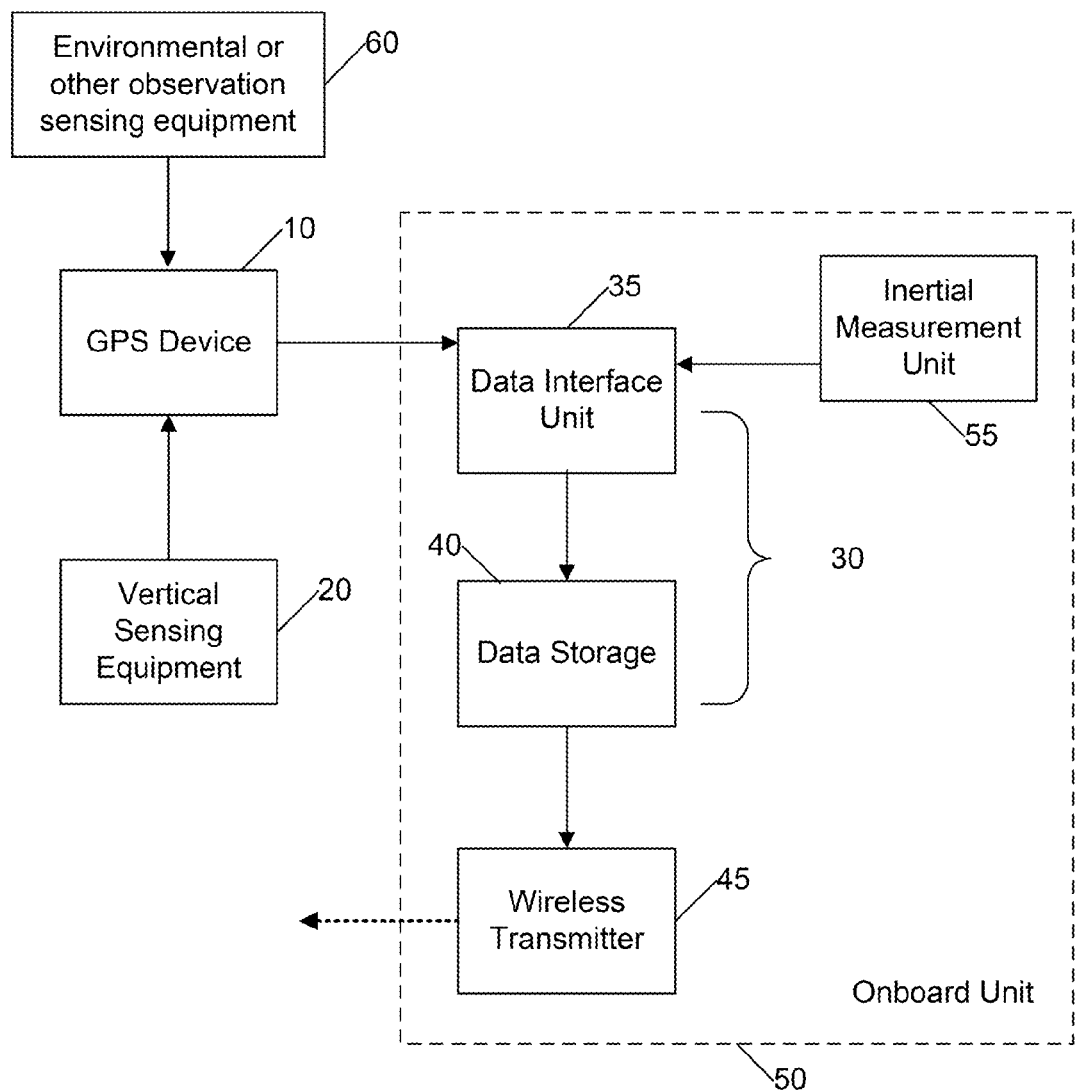
FIG. 1 is a block diagram of an onboard unit in accordance with an aspect of the present invention.

Referring initially to FIG. 1, an onboard unit 50 in accordance with an aspect of the present invention is shown. As described above, onboard unit 50 interfaces with a GPS device 10, which acquires position information (e.g., horizontal information) and receives elevation/depth information from sonar or other vertical feature sensing equipment 20. GPS device 10 preferably provides information to onboard unit 50 in an industry-standard format such as that prescribed by the National Marine Electronics Association ("NMEA").

While GPS device 10 is shown separately from vertical sensing equipment 20, the devices may be combined so that a single device, e.g., GPS device 10, obtains all position and elevation/depth information. Additionally, while GPS device 10 is shown as communicating directly with onboard unit 50, in some embodiments, there may be an intermediary such as a commercial chartplotter device (not shown) which communicates with the GPS device 10 and onboard unit 50.

Onboard unit 50 includes a data recorder 30 and a wireless transmission system 45 in communication with each other. Data recorder 30 includes a data interface unit 35 (e.g., a processor) and a data storage medium 40 in communication with each other. In some aspects, onboard unit 50 further includes an inertial measurement unit or attitude sensor 55 in communication with data recorder 30.

As shown in FIG. 1, onboard unit 50 records GPS device 10 output such as time, date, position, elevation, water depth, heading, speed, and quality of position information for each data set (hereinafter referred to as a "trackline"). Onboard unit 50 may also record pitch, roll, yaw, and acceleration data from attitude sensor 55 for each trackline. Attitude sensor 55 may be used to increase accuracy of or qualify the acquired data during processing, as will be described later. An exemplary attitude sensor is described in U.S. Pat. No. 6,421,622 to Horton et al, incorporated herein by reference.

In some aspects, the software resident in onboard unit 50 provides metadata to identify the mobile platform and controls the autonomous functions of data recorder 30 and communication interfaces 35, 45. For example, the software resident in the onboard unit 50 may include default instructions on how to record and store data.

Figure 2:
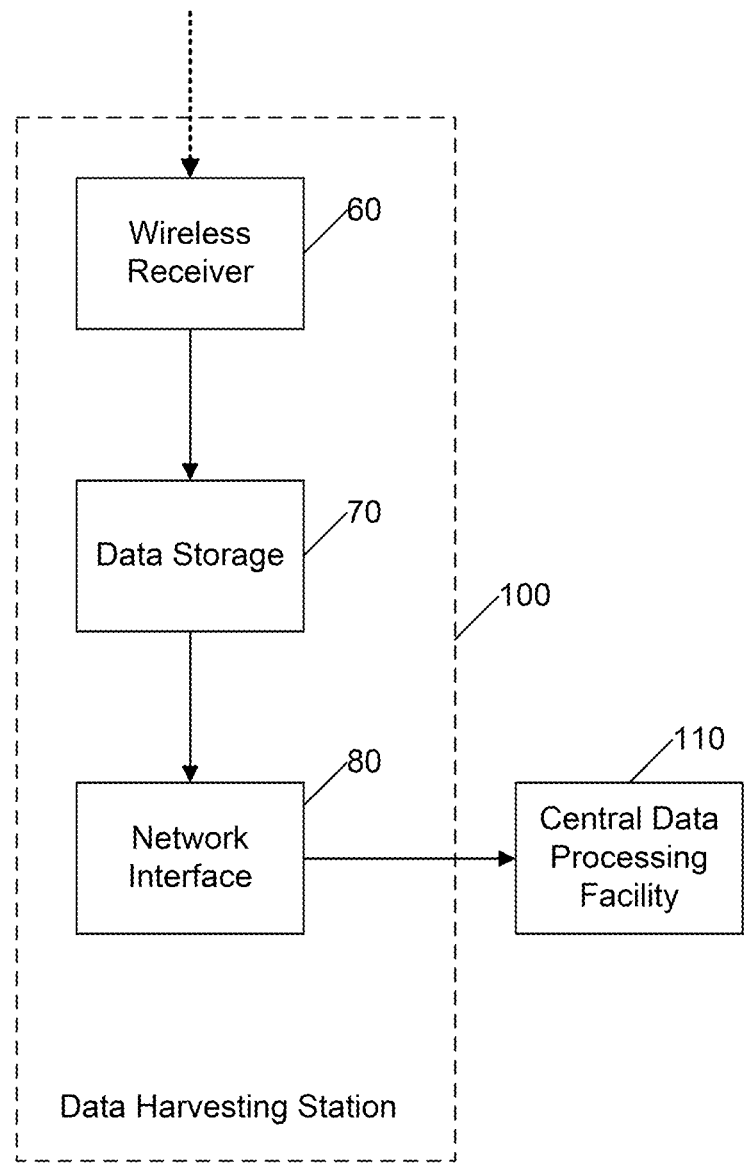
FIG. 2 is a block diagram of a data harvesting station in communication with a central data processing facility in accordance with an aspect of the present invention.
Figure 3:
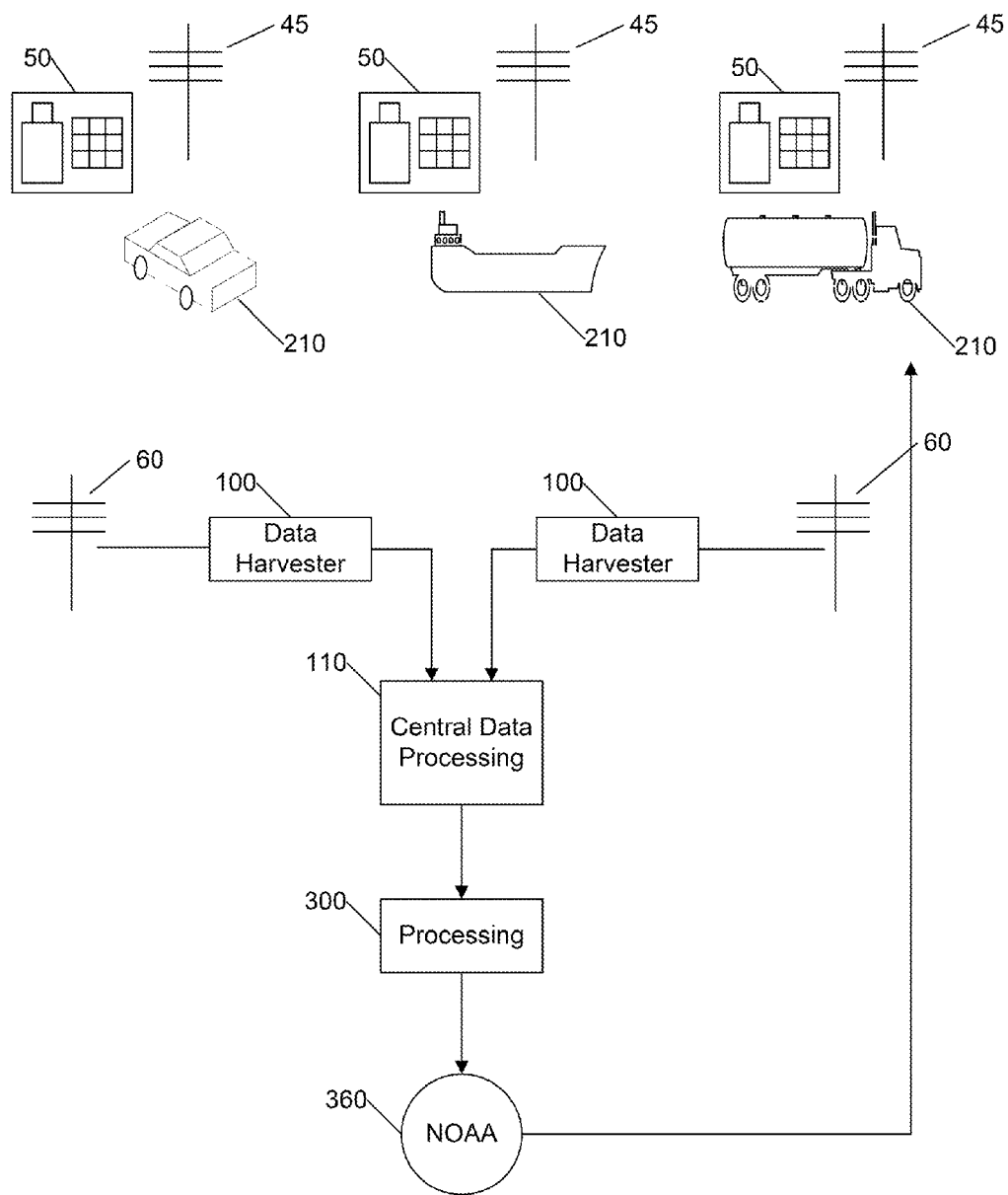
FIG. 3 is a schematic drawing of the objects illustrated in FIGS. 1 and 2 in communication with each other.

Referring now to FIGS. 1, 2 and 3, wireless communication system 45 is used to offload the acquired trackline data to a data harvesting station 100. In some aspects, the data harvesting station is land-based. As shown in FIG. 2, a data harvesting station 100 includes a wireless receiving system 60, a data storage medium 70 and network interface 80 in communication with each other.

In some aspects, wireless receiving system 60 receives data from onboard unit 50 and data storage medium 70 stores the received data. In some aspects, network interface 80 serves to upload the harvested data via a network to a central data processing facility 110. It is envisioned that an onboard processor with resident software may control the autonomous functions of data harvesting station 100.

In some aspects, data harvesting station 100 comprises a personal or desktop computer. In other aspects, data harvesting station 100 comprises a dedicated server or data storage center.

Referring still to FIG. 3, in one embodiment, when onboard unit 50 is within range of a harvesting station 100, wireless transmission system 45 transmits the collected data to harvesting station 100. Alternatively, onboard unit 50 may transmit data via satellite to data harvesting station 100 or directly to central data processing facility 110, so that being within range of harvesting station 100 is not necessary.

Subsequently, data harvesting station 100, via network interface 80, transmits the collected data to central data processing facility 110, where the data is processed and added to the collective database. In some embodiments, central data processing facility 110 is combined with data harvesting station 110. In such embodiments, both data collection or harvesting and processing are performed using the same equipment/facility.

In some embodiments, onboard unit 50 transmits data to harvesting station 100 at predetermined intervals. In other embodiments, onboard unit 50 only transmits intermittently, such as when within range of harvesting station 100 and/or when onboard data storage 40 reaches a predetermined capacity.

In some aspects, central data processing facility 110 includes network-connected commercial computer systems that are used to process and store the trackline data sent from the individual data harvesting stations 100. The data processing may include not only quality control checks using error checking routines, but also corrections for factors such as observed tidal activity, static and dynamic offsets, environmental influences, and measured inertial parameters using established methods, which are based on the application of geometric and engineering principles to the static and dynamic factors, as will be described later.

Exemplary structures of wireless communication systems such as wireless transmission system 45 and wireless receiving system 60 will be described later in accordance with FIG. 6. Exemplary structures of a computer system such as network interface 80 and central data processing facility 110 will be described later in accordance with FIG. 7.

Figure 4:
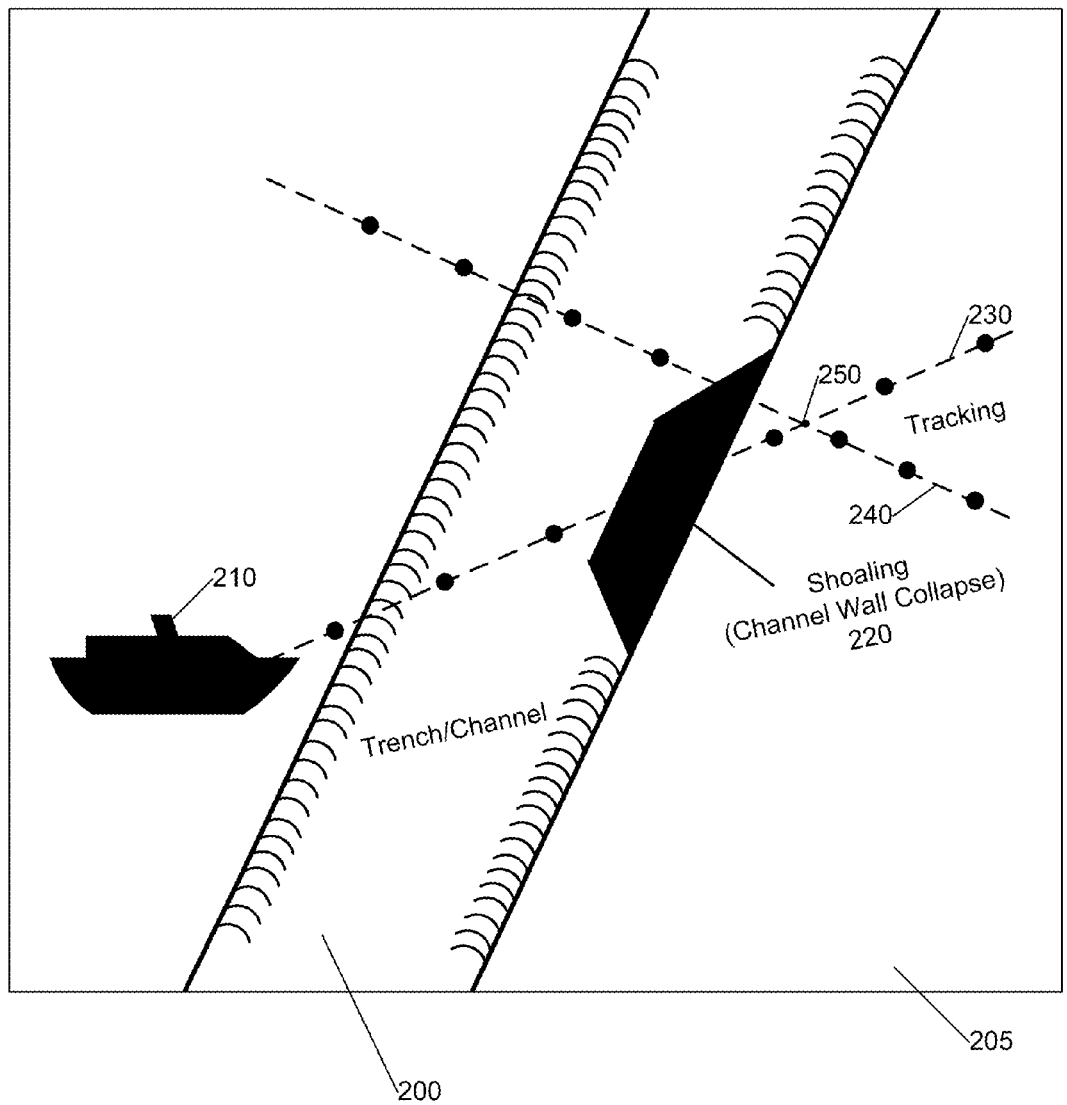
FIG. 4 is a schematic drawing illustrating collected tracklines in accordance with an aspect of the present invention.

Referring now to FIG. 4, exemplary hydrographic survey trackline data collections are shown in ocean 205. As depicted, a trench/channel 200 is shown with shoaling, or channel wall collapse 220. A first trackline 230 for which a vessel 210 is currently traveling is being recorded. A second trackline 240 is also shown which may have been recorded at an earlier time by a different vessel. The two tracklines intersect at 250 and transect channel wall collapse 220. The vertical component of track lines 230, 240 may be acquired using vertical sensing equipment 20 such as single-beam sonar equipment.

It should be appreciated that the number of transect lines over which these mobile platforms routinely travel has the potential to provide large amounts of reference data on the current topography. In the event that abnormalities are discovered, newly identified areas can be imaged using higher precision techniques (e.g., multibeam sonar, geodetic techniques) to resolve ambiguities. Through the technique proposed herein, detailed surveys can also be more concentrated on areas that receive inadequate coverage.

Figure 5:
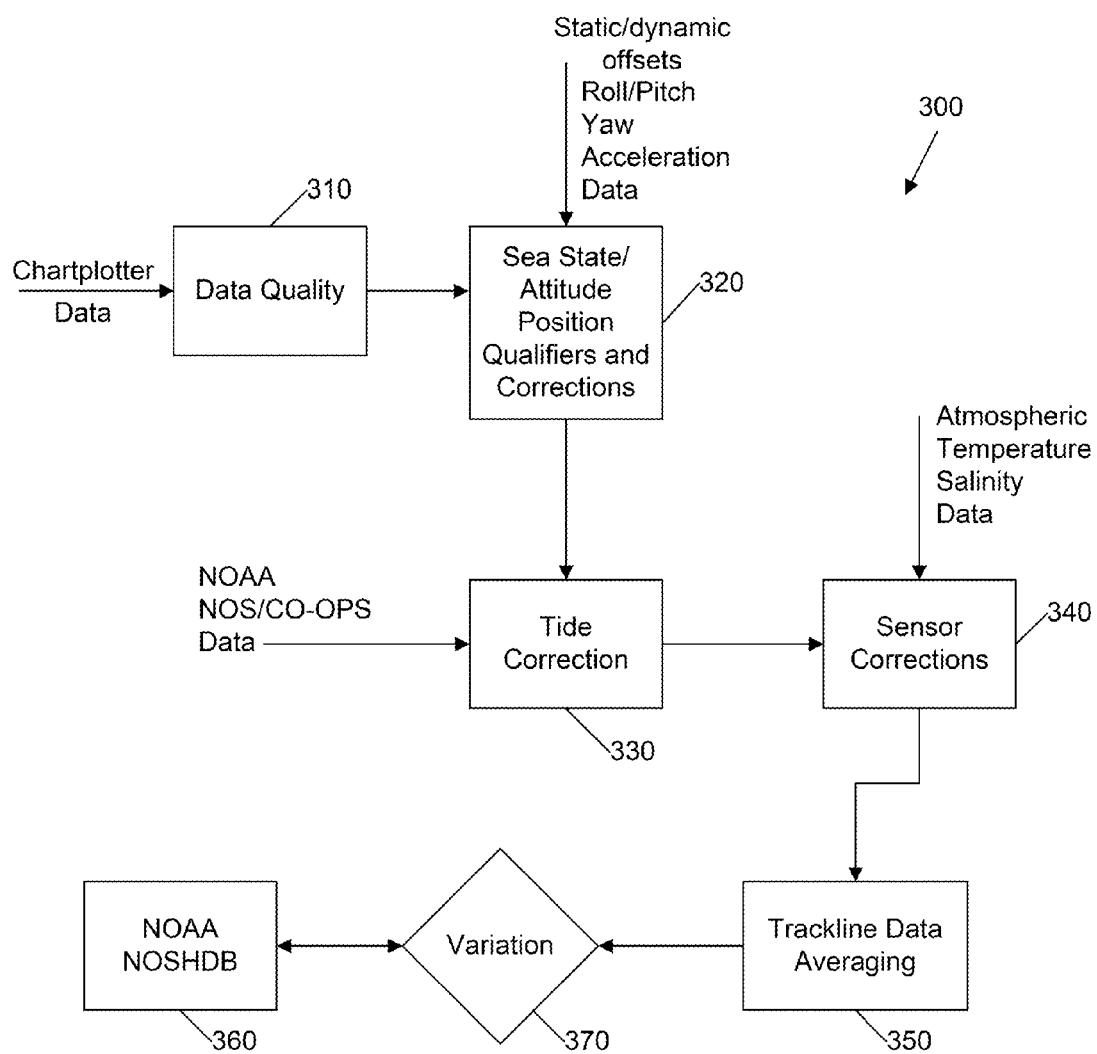
FIG. 5 is a block diagram illustrating data processing in accordance with an aspect of the invention.

Referring now to FIGS. 3 and 5, in one aspect, data processing facility 110 post-processes the incoming trackline data to provide a consolidated solution using the data from all of the individual vessels throughout time. The ever-increasing database may be collectively and continuously processed to establish and refine the measurement of elevation or water depth at each location for which data has been collected. The output from this collective processing may be periodically provided to the agencies or commercial entities responsible for providing contour maps (e.g., NOAA) for inclusion into their geographic and hydrographic databases.

As illustrated in FIG. 5, a data processing method 300 is performed at data processing facility 110. According to data processing method 300, raw data 310, which comprises the GPS device 10 data, is received at data processing facility 110. For example, data may be corrected for both vertical and horizontal position error. In one aspect, raw data 310 is then corrected using attitude data 320. For example, a raw data point may be corrected using roll/pitch, heading, heave, etc., data as collected by attitude sensor 55. Vertical error may be corrected by determining vertical heave by double integrating the vertical accelerations measured. The horizontal corrections may be performed by using differential GPS ("DGPS") data or blending DGPS data with the measured inertial parameters. Correction for elevation or depth data may be performed by methods known to those of skill in the art.

In some instances, as a supplement or alternative to applying corrections, portions of data sets or tracklines can be eliminated based on exceeding predetermined thresholds of attitude quantities or position quality indicators 320.

After the data has undergone attitude qualification and correction, the data may then be processed for environmental effects such as tide correction. Tide correction 330 is known by one skilled in the art and is the process by which the tracklines are corrected for observed tide, thereby producing data relative to mean lower low water ("MLLW"). This MLLW data is important, as the resulting information provides a normalized water depth. Tide correction information is available directly from NOAA and published on the internet, or can be obtained through independent measurements.

Once the data has undergone the normalization correction, the data may then be processed for environmental effects correction 340. For example, because water depth readings are dependent on velocity of sound in water, which is in turn dependent on salinity and temperature, correcting for sound velocity variation provides a more accurate water depth measurement. Similar to tide correction, sound velocity correction information is available directly from NOAA and published on the internet, or can be obtained through independent measurements.

Coupling available elevation or depth measurement technology with an inertial navigation package and state-of-the-art commercial GPS technology provides the ability to collect a data set (e.g., trackline) that can be post-processed to remove influences of platform motion, environmental offsets, and positional offset caused by GPS inaccuracies. After the three corrections 320, 330, 340 are performed, the trackline data may be averaged 350 and a contour map produced from the results. It is useful to note that each location comprises a single data point. For each data point, the data is corrected. The collected data points for a single trip, e.g., a data set, are referred to as a trackline. Thus, each trackline is corrected for at each data point. The plurality of tracklines collected are then averaged 350. Using the averaged data from the collected tracklines allows the contour map to be generated. The contour map may be produced like that generated in early mapping using an elevation reference and geographic triangulation. It should be appreciated that any combination of the corrections 320, 330, 340 may be performed or none may be performed prior to averaging the trackline data 350. Standard error analysis techniques may be used to determine the optimum application of corrections.

As an alternative to any combination of corrections 320, 330, 340, the contour map may be compared to existing map data to estimate the total bias influence of the collective corrections, without regard for the individual bias contributions of each correction. This can be done, for example, by comparing the average depth of the contour map to that of the existing map data over the area of interest. In the case of hydrographic surveying, this process leverages the "law of conservation of sediment," which claims that the average water depth over the survey area has, effectively, not changed between the time that the reference data set and the contour map data set were generated. Stated otherwise, the total volume of bottom material over the survey area has not changed over time, rather it has been redistributed within the survey area. By correcting all water depths of the contour map to make the contour map average depth equal the existing map data average depth, the total bias influence of the collective corrections 320, 330, 340 is accounted for. This is a back-calculation of the corrections, versus an upfront application of individual corrections as presented above.

The resulting contour map can then be used to check whether it is consistent with existing map data such as those provided by appropriate agencies (e.g., NOAA) 360. If variances are detected 370, the appropriate agencies such as NOAA are alerted. It should be understood that while NOAA is shown in the Figures, any appropriate agency or commercial entity, such as an agency concerned with terrain maps, may be alerted.

In some aspects, the produced contour maps may be sent to mobile platforms as updated charts or maps. Reversing the cycle previously described, the updated data is sent to the data harvesting stations 100 and wirelessly transmitted back to the individual platforms via the onboard units 50 and downloaded to GPS devices 10 as updates to the electronic navigational charts.

In some aspects, the onboard unit 50 serves as a wireless communication router. By properly configuring the hardware and software of the wireless transmitter 45, the onboard unit may provide two-way communication access to other systems onboard the mobile platform, such as personal computers, GPS devices 10, and maintenance systems. In some aspects, the onboard unit 50 connects to data harvesting station 100 for internet connectivity. The post-processed data or other utilities can be provided to these platforms through this data feed. Other utilities may include standard web applications such as news and weather feeds and electronic mail, in addition to custom applications developed to service the platforms such as electronic information updates based on any post-processed data provided by the cooperative platforms.

In some aspects, multiple platforms, each equipped with an onboard unit 50, form a meshed network of communication nodes. Onboard units 50 provide a communication link between platforms for inter-platform communication, and allows platforms to serve as network repeaters, extending the range of data harvesting station 100 wireless connectivity.

In some aspects, onboard unit 50 records other available sensor data, such as environmental or onboard platform systems parameters and manual triggers using suitable sensing equipment 60. This data is preferably time and georeferenced and harvested along with position and elevation/depth measurements.

A benefit associated with the present invention is that data is collected any time a platform is underway and the data is automatically harvested. By collecting these data each time these platforms are underway, the invention creates a contour map by overlaying tracklines collected by mobile units operating in the same region. Because mobile GPS devices are already in service throughout the world, they ensure that the most frequently traveled areas are also the most accurately mapped.

The present invention provides for the collection of surveying data from mobile platforms engaged in routine activities, as opposed to the deliberate collection of data using dedicated equipment. The present invention enables more platforms to function as survey vessels, thus becoming multi-mission platforms in transit to and from primary mission destinations.

Additional benefits include:
(1) makes use of information (position and altitude or depth) that is readily available and routinely partially processed by operators to provide them with instantaneous situational awareness;
(2) provides not only for permanent storage of every elevation measurement, but also for infinite opportunities for computer processing of the individual and collective data sets;
(3) provides for the regular autonomous collection and processing of data, with no operator intervention required;
(4) provides for the automated correction of acquired datasets for the influences of environmental parameters through web interfacing to published datasets acquired from existing monitoring stations;
(5) provides for the automated correction of acquired datasets for the influences of platform motion recorded using an integrated inertial measurement system;
(6) provides for the automated correction of acquired data sets for the influences of measurement errors by comparison to previous reference data;
(7) continuously builds upon a cumulative data set to provide statistical confidence and to refine and maintain the survey of a specific area, as opposed to alleging the survey to be the results of one set of measurements;
(8) provides a low-cost supplement to the existing efforts of specialized and dedicated surveying platforms;
(9) provides a meshed network for two-way communication between platforms and shared network connectivity; and
(10) provides for the simultaneous georeferenced acquisition of other available data of interest.

Additionally, in the case of hydrographic surveying, the present invention provides for a means to address updated requirements for coastal areas and tributaries not serviceable by the majority of hydrographic survey vessels. For example, 12-foot-and-under water depths generally cannot be measured using standard multibeam sonar systems currently in use. Using single beam sonar equipment from GPS 10, however, allows for these water depths to be measured. And, because the 12-foot-and-under water depths are the very areas frequented by commercial fishermen, public service vessels, and recreational boaters, most of which are routinely monitoring water depth, this aspect of the invention is a valuable supplement to nautical charts currently lacking this information as well as to mariners frequenting these waters.

In summary, the present invention is packaged to optimize functionality, performance, and cost. Once the industry-standard systems are installed and self-formulate the industry-standard network, the systems function autonomously with no interaction required on the platforms or at the data harvesting stations. Gathering the available data reduces the costly incidents of striking submerged objects and groundings, and is in the best interest of the mariners, insurance companies, and government entities.

Figure 6:
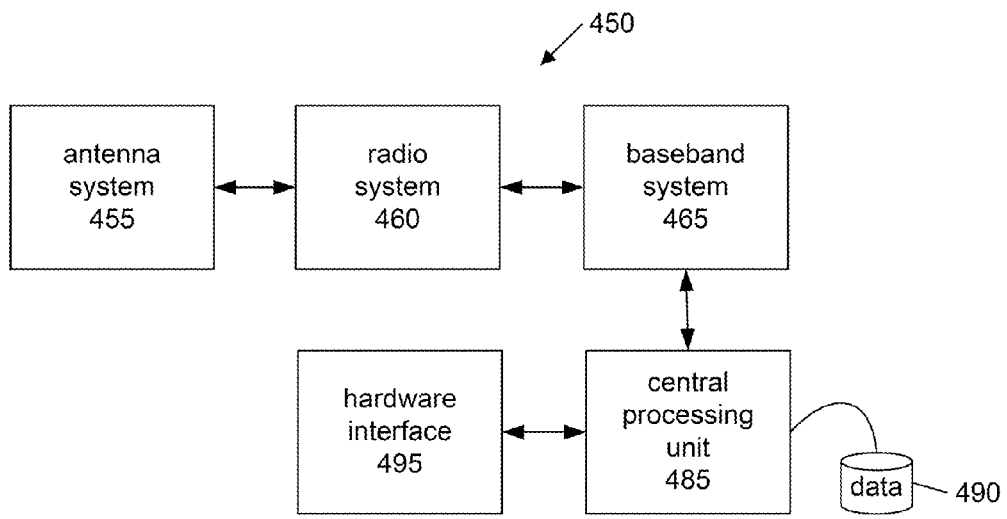
FIG. 6 is a block diagram illustrating an example wireless communication device that may be used in connection with various embodiments described herein.

Referring now to FIG. 6, FIG. 6 is a block diagram illustrating an example wireless communication device 450 that may be used in connection with various embodiments described herein. For example, the wireless communication device 450 may be used in conjunction with data recorder 30 as part of wireless transmission system 45 and/or as part of data interface unit 35. Wireless communication device 450 may also be used as part of wireless receiving system 60. However, other wireless communication devices and/or architectures may also be used, as will be clear to those skilled in the art.

In the illustrated embodiment, wireless communication device 450 comprises an antenna system 455, a radio system 460, a baseband system 465, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communicate over various frequencies. In one embodiment, the radio system 460 may combine a demodulator (not shown) and modulator (not shown) in one integrated circuit ("IC"). The demodulator and modulator can also be separate components.

In the incoming path, the demodulator strips away the RF carrier signal leaving a baseband receive audio signal, which is sent from the radio system 460 to the baseband system 465.

The baseband system 465 codes the digital signals for transmission and generates a baseband transmit signal that is routed to the modulator portion of the radio system 460. The modulator mixes the baseband transmit signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIGS. 1 and 2.

In this description, the term "computer readable medium" is used to refer to any media used to provide executable instructions (e.g., software and computer programs) to the wireless communication device 450 for execution by the central processing unit 485. Examples of these media include the data storage area 490, antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 7:
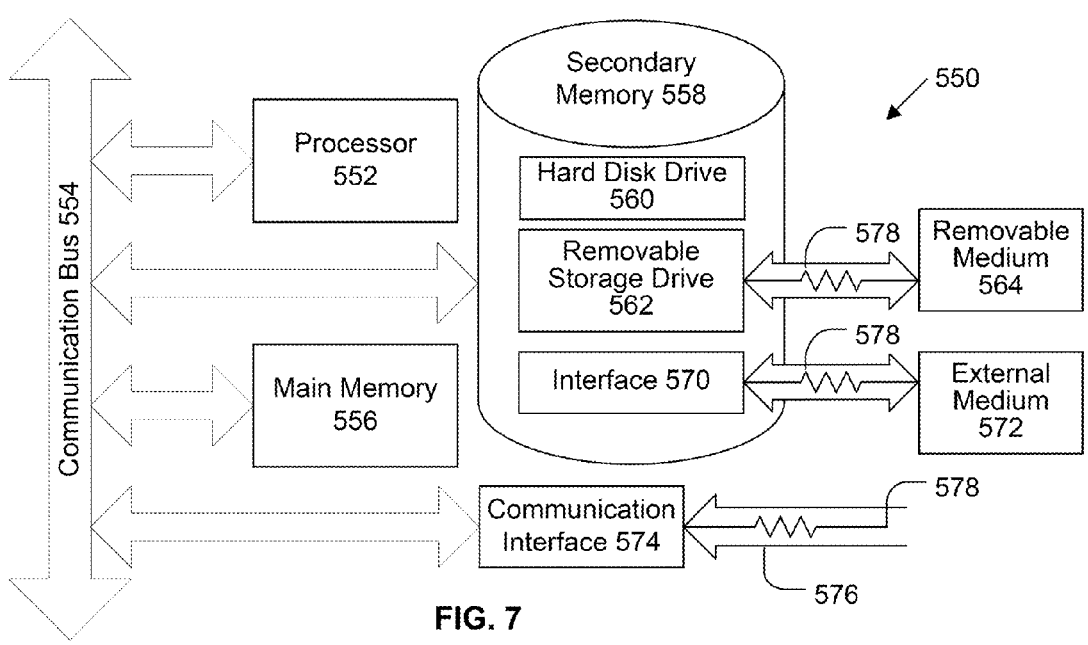
FIG. 7 is a block diagram illustrating an example computer system that may be used in connection with various embodiments described herein.

FIG. 7 is a block diagram illustrating an example computer system 550 that may be used in connection with various embodiments described herein. For example, the computer system 550 may be used in conjunction with data harvesting station 100 as part of network interface 80 and/or as central data processing facility 110. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (e.g., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g., printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for collecting and processing location data comprising:
   a vehicle comprising:
      a vertical sensing device configured to receive elevation or depth data;
      a global positioning system (GPS) device in communication with the vertical sensing device; and
      a data collection device in communication with the GPS device;
   wherein the data collection device collects position data from the GPS device and is configured to transmit the position data to a remote data station.

2. The system of claim 1, wherein the data collection device is in communication with a sensor configured to provide attitude data.

3. The system of claim 1, wherein the vertical sensing device is selected from the group consisting of augmented GPS, radar, altimetry, sonar, and combinations thereof.

4. The system of claim 1, wherein the data collection device is configured to receive at least one of time, horizontal position, elevation, depth, heading, speed, environmental data, platform status, and quality of information data.

5. The system of claim 1, wherein the data collection device comprises:
   a data interface module;
   a data storage module; and
   a wireless transmission module, wherein the data interface module is in communication with the GPS device and the data storage module and wherein the data storage module is in communication with the wireless transmission module, the wireless transmission module being configured to transmit the position information to a remote data station.

6. The system of claim 1, wherein the vehicle is selected from the group of air vehicles, land vehicles, sea vehicles, or combinations thereof.

7. The system of claim 1, wherein the data collection device further comprises an attitude sensor module.

8. The system of claim 1, wherein the data collection device is configured to include metadata with the position data, the metadata providing identifying information for the vehicle.

9. A system for storing and transmitting data comprising:
   a data collection device comprising:
      a data interface module configured to receive location data;
      a data storage module configured to store the location data; and
      a wireless transmission module configured to transmit the location data, wherein the data interface module is in communication with the data storage module and wherein the data storage module is in communication with the wireless transmission module and wherein the wireless transmission module serves as a two-way communication node for other data collection devices.

10. The system of claim 9, wherein the data interface module receives location data from at least one of a horizontal position device and a vertical position device.

11. The system of claim 9, wherein the wireless transmission module transmits location data to a remote data harvesting station.

12. The system of claim 11, wherein the remote data harvesting station comprises:
   a wireless receiving module configured to receive location data from the wireless transmission module;
   a data storage module configured to store the location data; and
   a network interface configured to transmit the location data over a network, wherein the wireless receiving module is in communication with the data storage module and wherein the data storage module is in communication with the network interface.

13. The system of claim 9, wherein for a plurality of data collection devices, each having a wireless transmission module, the communication nodes form a meshed network.

14. The system of claim 13, wherein the meshed network provides for connectivity between the plurality of data collection devices.

15. The system of claim 13, wherein the meshed network provides for sharing a network connection of said data harvesting station.

16. A method of processing location data comprising:
   receiving location data from a vehicle comprising a global positioning system (GPS) device and a data collection device in communication with the GPS device, wherein the data collection device collects position data from the GPS device and is configured to transmit the position data to a remote data station;
   correcting the location data by eliminating duplicate data; and
   performing at least one of the following corrections:
      correcting the location data with attitude data;
      correcting the location data with horizontal data;
      correcting the location data with elevation or depth data;
      correcting the location data with environmental effect data.

17. The method of claim 16, further comprising compiling the corrected location data from a plurality of said vehicles into a plurality of tracklines and processing said tracklines to produce a contour map.

18. The method of claim 17, further comprising comparing the produced contour map to reference data to correct for static and dynamic measurement influences.

19. The method of claim 16, wherein attitude data correction includes correcting for roll/pitch, heading, and heave.

20. The method of claim 16, wherein elevation or depth correction includes correcting for vertical heave.

21. The method of claim 16, wherein the environmental effect correction includes tide correction and sound velocity correction.

22. The method of claim 16, further comprising using the corrected location data to measure a tide variation.

23. The method of claim 16, further comprising using the corrected location data to measure a tide variation from a plurality of vehicles.

24. The method of claim 16, further comprising using an aspect of said location data to prioritize detailed surveying.

25. The method of claim 16, further comprising using said corrected location data to monitor at least one of: erosion, sedimentation and shoaling.

* * * * *